US008520542B2

(12) United States Patent
Chang et al.

(10) Patent No.: US 8,520,542 B2
(45) Date of Patent: Aug. 27, 2013

(54) UPLINK POWER CONTROL MESSAGE DESIGN IN WIRELESS OFDMA SYSTEMS

(75) Inventors: Yu-Hao Chang, Daya Township, Taichung County (TW); Yih-Shen Chen, Hsinchu (TW)

(73) Assignee: MediaTek Inc. (TW)

( * ) Notice: Subject to any disclaimer, the term of this patent is extended or adjusted under 35 U.S.C. 154(b) by 379 days.

(21) Appl. No.: 12/924,650

(22) Filed: Sep. 30, 2010

(65) Prior Publication Data

US 2011/0199990 A1    Aug. 18, 2011

Related U.S. Application Data

(60) Provisional application No. 61/303,719, filed on Feb. 12, 2010.

(51) Int. Cl.
*H04J 1/16* (2006.01)
*H04L 12/26* (2006.01)
*H04L 12/28* (2006.01)
*H04W 4/00* (2009.01)

(52) U.S. Cl.
USPC .............................. 370/252; 370/329; 370/431

(58) Field of Classification Search
None
See application file for complete search history.

(56) References Cited

U.S. PATENT DOCUMENTS

| 7,426,176 | B2 | 9/2008 | Liu et al. ........................ 370/206 |
| 7,558,535 | B2 | 7/2009 | Cho et al. ......................... 455/69 |
| 2008/0031172 | A1* | 2/2008 | Nanda et al. ................ 370/310.1 |
| 2008/0167040 | A1 | 7/2008 | Khandekar et al. ........... 455/436 |
| 2009/0046800 | A1* | 2/2009 | Xu et al. ........................ 375/267 |
| 2009/0262670 | A1 | 10/2009 | Cho et al. ....................... 370/280 |
| 2010/0040014 | A1* | 2/2010 | Kang et al. ..................... 370/329 |
| 2011/0044223 | A1 | 2/2011 | Kim et al. ...................... 370/312 |
| 2011/0098076 | A1* | 4/2011 | Kim et al. ...................... 455/522 |

FOREIGN PATENT DOCUMENTS

| CN | 101044700 A | 8/2004 |
| CN | 1780464 A | 5/2006 |
| CN | 101123805 A | 2/2008 |
| CN | 101203045 A | 6/2008 |
| CN | 101252776 A | 8/2008 |
| EP | 1411647 A2 | 4/2004 |

OTHER PUBLICATIONS

International Search Report and Written Opinion of International Search Authority for PCT/CN2010/080066 dated Mar. 24, 2011 (12 pages).

(Continued)

*Primary Examiner* — Chirag Shah
*Assistant Examiner* — Ashley Shivers
(74) *Attorney, Agent, or Firm* — Imperium Patent Works; Zheng Jin

(57) ABSTRACT

A method of uplink power control in a wireless OFDMA system is provided. A serving base station first configures a fast feedback channel by transmitting a feedback allocation message to a mobile station. The mobile station then reports downlink channel information via the allocated fast feedback channel. Based on the reported downlink channel information, the serving base station estimates uplink channel quality and thereby detects a channel variation and generates an uplink power adjustment message that delivers a power offset to adjust the transmitting power level of the mobile station. In one novel aspect, the uplink power adjustment message also comprises feedback allocation information that re-configures the fast feedback channel without extra signaling overhead. In addition, the novel power adjustment message eliminates redundant information such that it is transmitted via a minimum resource unit without requiring extra resource.

21 Claims, 5 Drawing Sheets

(56) References Cited

OTHER PUBLICATIONS

Park et al., "Text Proposal of PC-A-MAP IE Assignment in IEEE 802.16 D3," IEEE C802.16m-09/2859, Dec. 30, 2009.
SIPO, Examination Report of Chinese patent application 201080002988.5 dated Apr. 22, 2013 (4 pages).
IEEE Std 802.16™-2009, "Part 16: Air Interface for Broadband Wireless Access Systems", IEEE LAN/MAN Standards Committee (52 pages).
USPTO, Office Action of related U.S. Appl. No. 12/924,676 dated May 17. 2013 (15 pages).
The EPO has prepared the Search Report of European patent application EP10845595 dated Jun. 13, 2013 (9 pages).
Draft Amendment to IEEE Standard for Local and Metropolitan Area Networks, Part 16: Air Interface for Fixed and Mobile Broadband Wireless Access Systems, IEEE P802.16m/D4-Feb. 2010, paragraph [16.3.6.5.2.4.5], paragraph [16.3.9.3.1], paragraph [16.3.9.4.1].
The EPO has prepared the Search Report of European patent application EP10845592 dated Jun. 21, 2013 (8 pages).
Draft Amendment to IEEE Standard for Local and Metropolitan Area Networks, Part 16: Air Interface for Fixed and Mobile Broadband Wireless Access Systems, IEEE P802.16m/D4-Feb. 2010, paragraph [16.3.6.3.2.3]—paragraph [16.3.6.3.2.4], paragraph [16.3.9.3.1], paragraph [16.3.9.4].
Text Proposal of PC-A-MAP IE Assignment in IEEE802.16 D1 (5.3.6.5.4.10), IEEE C802.16m-09/2072, Aug. 30, 2009, p. 2, p. 5, p. 7, p. 8.

* cited by examiner

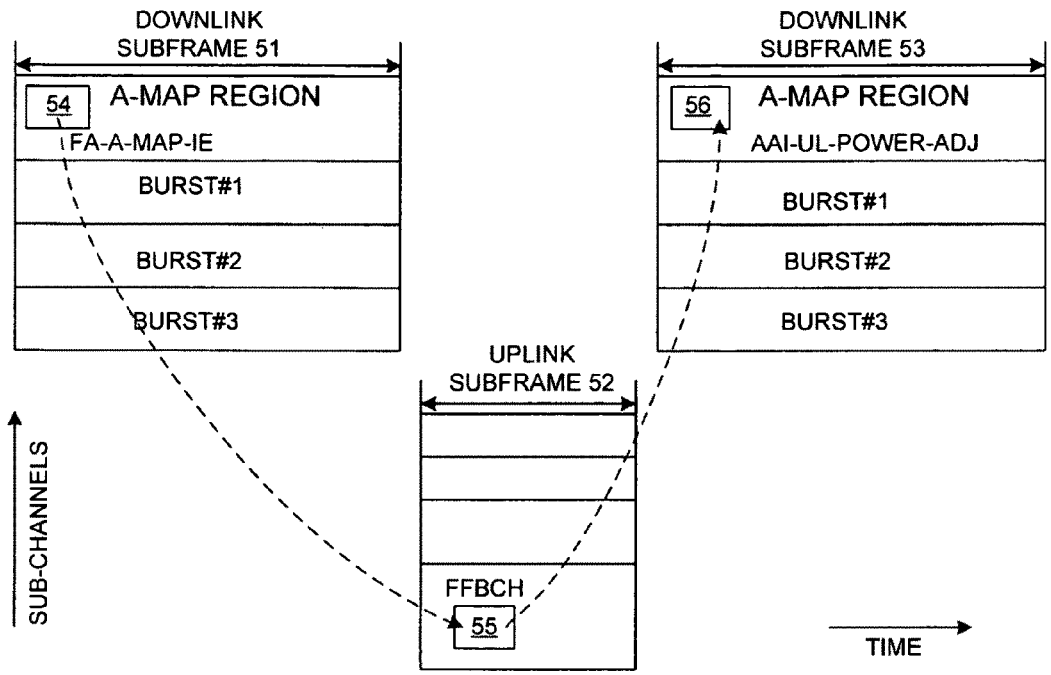
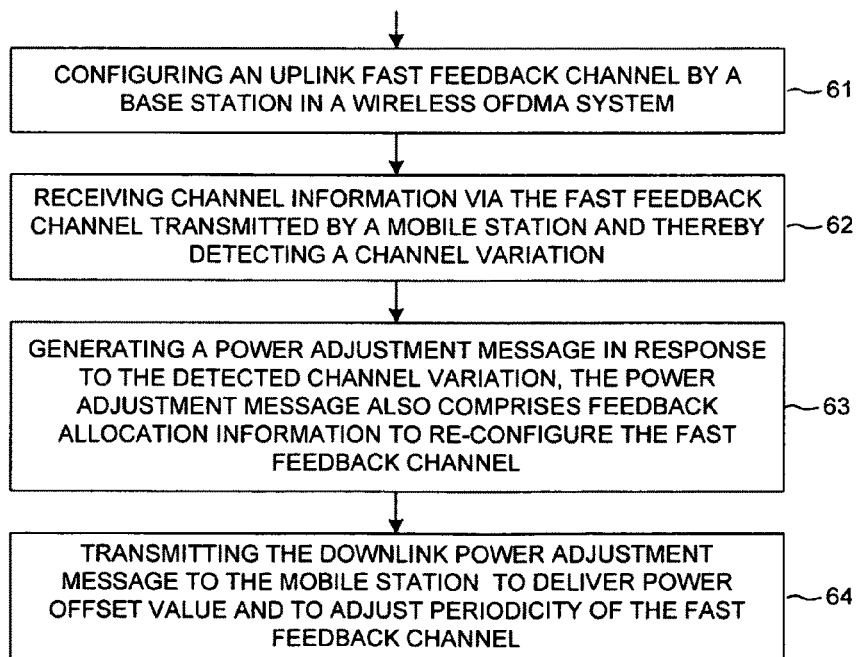
FIG. 4

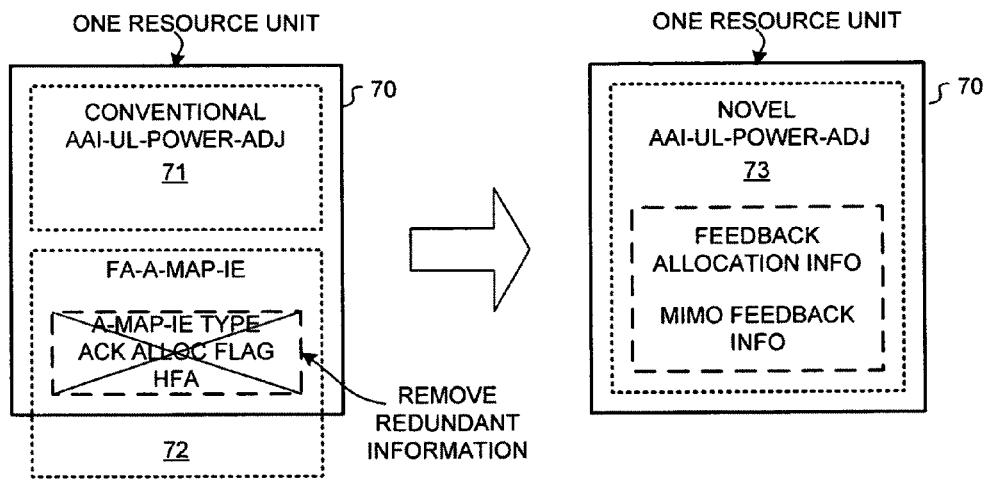

FIG. 5

| NAME | VALUE | USUAGE |
| --- | --- | --- |
| DATA OFFSET | 0 ... 63 | POWER OFFSET DATA VALUE |
| CONTROL OFFSET | 0 ... 63 | POWER OFFSET CONTROL VALUE |
| CONTROL FLAG | 0, 1 | INDICATES WHETHER FA-A-MAP-IE EXISTS IN THIS MESSAGE |
| CHANNEL INDEX | 0 ... 63 | THIS FIELD EXISTS ONLY OF CONTROL FLAG == 1 |
| SHORT TERM FEEDBACK PERIOD | 0 ... 7 | THIS FIELD EXISTS ONLY OF CONTROL FLAG == 1 |
| LONG TERM FEEDBACK PERIOD | 0 ... 3 | THIS FIELD EXISTS ONLY OF CONTROL FLAG == 1 |
| FRAME OFFSET NUMBER | 0 ... 3 | THIS FIELD EXISTS ONLY OF CONTROL FLAG == 1 |
| SUBFRAME INDEX | 0 ... 7 | THIS FIELD EXISTS ONLY OF CONTROL FLAG == 1 |
| ALLOCATION DURATION | 0 ... 7 | THIS FIELD EXISTS ONLY OF CONTROL FLAG == 1 |

POWER ADJUSTMENT MESSAGE DESIGN #1

FIG. 6

| NAME | VALUE | USUAGE |
| --- | --- | --- |
| DATA OFFSET | 0 ... 63 | POWER OFFSET DATA VALUE |
| CONTROL OFFSET | 0 ... 63 | POWER OFFSET CONTROL VALUE |
| CONTROL FLAG | 0, 1 | INDICATES WHETHER FA-A-MAP-IE EXISTS IN THIS MESSAGE |
| CHANNEL INDEX | 0 ... 63 | THIS FIELD EXISTS ONLY OF CONTROL FLAG == 1 |
| SHORT TERM FEEDBACK PERIOD | 0 ... 7 | THIS FIELD EXISTS ONLY OF CONTROL FLAG == 1 |
| LONG TERM FEEDBACK PERIOD | 0 ... 3 | THIS FIELD EXISTS ONLY OF CONTROL FLAG == 1 |
| FRAME OFFSET NUMBER | 0 ... 3 | THIS FIELD EXISTS ONLY OF CONTROL FLAG == 1 |
| SUBFRAME INDEX | 0 ... 7 | THIS FIELD EXISTS ONLY OF CONTROL FLAG == 1 |
| ALLOCATION DURATION | 0 ... 7 | THIS FIELD EXISTS ONLY OF CONTROL FLAG == 1 |
| mFM | 0 ... 7 | THIS FIELD EXISTS ONLY OF CONTROL FLAG == 1 |
| maxMt | 0 ... 3 | THIS FIELD EXISTS ONLY OF CONTROL FLAG == 1 & mFM != 1 |
| FEEDBACK FORMAT | 0 ... 3 | THIS FIELD EXISTS ONLY OF CONTROL FLAG == 1 & mFM == 2,3,5 or 6 |
| FPI | 0 ... 3 | THIS FIELD EXISTS ONLY OF CONTROL FLAG == 1 & mFM == 0,4 or 7 |
| LONG SHORT FPI SWITCH FALG | 0, 1 | THIS FIELD EXISTS ONLY OF CONTROL FLAG == 1 & mFM == 0 & q!=0b00 & FPCT ==2 |
| LONG TERM FPI | 0 ... 3 | THIS FIELD EXISTS ONLY OF CONTROL FLAG == 1 & mFM == 0 & q!=0b00 & FPCT >1 & FCPT !=2 |
| CODE BOOK MODE | 0 ... 3 | THIS FIELD EXISTS ONLY OF CONTROL FLAG == 1 & mFM == 3 or 6 |
| CODE BOOK SUBSET | 0, 1 | THIS FIELD EXISTS ONLY OF CONTROL FLAG == 1 & mFM == 3,4,6 or 7 & Nt == 4 |
| CODE BOOK COORDINATION | 0, 1 | THIS FIELD EXISTS ONLY OF CONTROL FLAG == 1 & mFM == 4 or 7 |
| MEASUREMENT METHOD INDICATION | 0, 1 | THIS FIELD EXISTS ONLY OF CONTROL FLAG == 1 & mFM == 0,1,2 or 5 |

POWER ADJUSTMENT MESSAGE DESIGN #2

FIG. 7

UPLINK POWER CONTROL MESSAGE DESIGN IN WIRELESS OFDMA SYSTEMS

CROSS REFERENCE TO RELATED APPLICATIONS

This application claims priority under 35 U.S.C. §119 from U.S. Provisional Application No. 61/303,719, entitled "Uplink Power Control Scheme in Wireless OFDMA System," filed on Feb. 12, 2010, the subject matter of which is incorporated herein by reference.

TECHNICAL FIELD

The disclosed embodiments relate generally to wireless network communications, and, more particularly, to power control message design in wireless Orthogonal Frequency Division Multiple Access (OFDMA) communication systems.

BACKGROUND

In wireless Orthogonal Frequency Division Multiple Access (OFDMA) communication systems, the transmitting power of each mobile station needs to be maintained at a certain level to achieve desired channel quality and to maximize system capacity. In a Close Loop Power Control (CLPC) mechanism, the transmitting power of a mobile station is controlled by a Transmit Power Control (TPC) command transmitted from a serving base station to the mobile station. The serving base station periodically monitors uplink channel quality of the mobile station, and in response, sends TPC commands for periodic transmitting power adjustments for the mobile station. Uplink channel quality of the mobile station can be derived or estimated by the serving base station based on the reported downlink channel measurements from the mobile station. For example, in Time Division Duplex (TDD) systems, uplink channel condition can be derived from downlink channel measurement due to channel reciprocity. On the other hand, in Frequency Division Duplex (FDD) systems, uplink channel condition can be estimated from downlink channel measurement by exploiting channel correlation between downlink and uplink channels.

FIG. 1 (Prior Art) is a signal diagram that illustrates operation of a conventional uplink power control scheme in a wireless OFDMA system 10. Wireless OFDMA system 10 comprises a serving base station BS11 and a mobile station MS12. In a signal diagram such as FIG. 1, time proceeds from top to bottom in the diagram. As illustrated in FIG. 1, serving base station BS11 first allocates a fast feedback channel (FFBCH) 14 by transmitting a first feedback allocation Advanced-MAP information element (FA-A-MAP-IE) 13 to MS12. FA-A-MAP-IE 13 decides the periodicity of FFBCH 14, which in turn determines how frequently BS11 tracks any uplink channel variation. Mobile station MS12 then measures and reports downlink channel information via the allocated FFBCH 14. The reported downlink channel information is used by base station BS11 to estimate uplink channel quality such as the signal to interference plus noise power ratio (SINR) of the uplink channel. Based on the estimated channel quality, BS11 derives power level of the uplink channel. BS11 is then able to determine whether there is any channel variation and whether a power adjustment is needed in response to the channel variation.

If a power adjustment is needed, then a power offset is delivered to MS12 via an uplink power adjustment (AAI-UL-POWER-ADJ) message 15. AAI-UL-POWER-ADJ message 15 is one of the downlink MAC control message signaled to a specific mobile station. AAI-UL-POWER-ADJ message 15 provides a large power jump to adapt to the detected channel variation quickly. As illustrated in FIG. 1, when BS11 observes a huge power gap in the uplink, BS11 would most likely also want to monitor any upcoming channel variation more closely. Therefore, in addition to AAI-UL-POWER-ADJ message 15 that is transmitted to MS12, BS11 also transmits a second FA-A-MAP-IE 16 to reconfigure FFBCH 14. For example, FA-A-MAP-IE 16 may shorten the periodicity of FFBCH 14 such that BS11 is able to monitor the uplink channel more frequently. It would be great to combine these two messages to save signaling overhead without requiring extra resource.

SUMMARY

A method of uplink power control in a wireless OFDMA system is provided. A serving base station first configures a fast feedback channel (FFBCH) by transmitting a feedback allocation message (FA-A-MAP-IE) to a mobile station. The FA-A-MAP-IE decides the starting frame and subframe, as well as the duration and periodicity of the FFBCH that the mobile station can use for periodically reporting downlink channel information. The mobile station then reports downlink channel information via the allocated FFBCH. The reported downlink channel information is used by the serving base station to estimate uplink channel quality such as the signal to interference plus noise power ratio (SINR) of the uplink channel. Based on the estimated uplink channel quality, the serving base station detects an uplink channel variation and generates an uplink power adjustment message (AAI-UL-POWER-ADJ) that delivers a power offset to adjust the transmitting power level of the mobile station.

The AAI-UL-POWER-ADJ message provides a large power jump for the mobile station to adapt to the detected channel variation quickly. When the serving base station detects a big power gap, it may also want to re-configure the duration and periodicity of the FFBCH. In one novel aspect, instead of transmitting another FA-A-MAP-IE, the novel AAI-UL-POWER-ADJ message also comprises feedback allocation information that re-configures the FFBCH without extra signaling overhead. The mobile station can use the same AAI-UL-POWER-ADJ message to adjust transmitting power level and to re-configure FFBCH. In one example, the feedback information may include a decreased periodicity of the FFBCH such that closer monitoring of the uplink channel can be performed by the base station in the event of large channel variation.

In Institute of Electrical and Electronics Engineers (IEEE) 802.16m compliant systems, a minimum resource unit contains seventy-two information bits for data channel transmission (e.g., as indicated by downlink basic A-A-MAP-IE). Thus, it would be most efficient to transmit both the AAI-UL-POWER-ADJ message and the feedback allocation information using a minimum resource unit. A minimum resource unit, however, is not big enough to hold a conventional AAI-UL-POWER-ADJ message as well as a conventional FA-A-MAP-IE. In accordance with one novel aspect, the novel AAI-UL-POWER-ADJ message eliminates redundant information between conventional AAI-UL-POWER-ADJ message and conventional FA-A-MAP-IE such that the novel AAI-UL-POWER-ADJ is transmitted via a minimum resource unit without requiring extra resource. In one example, the novel AAI-UL-POWER-ADJ message also comprises MIMO feedback related information. As a result, the mobile station can use the same AAI-UL-POWER-ADJ message to adjust transmitting power level, to allocate FFBCH, and to configure MIMO feedback operation.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is a diagram that illustrates a structure of a frame in accordance with a communication protocol employing a novel Power Adjustment Message design.

FIG. 4 is a flow chat that illustrates a method of uplink power control in accordance with one novel aspect.

FIG. 5 illustrates a novel uplink power adjustment message embedded with feedback control information.

FIG. 6 illustrates a first embodiment of a novel Power Adjustment Message design.

FIG. 7 illustrates a second embodiment of a novel Power Adjustment Message design.

DETAILED DESCRIPTION

Reference will now be made in detail to some embodiments of the invention, examples of which are illustrated in the accompanying drawings.

In wireless Orthogonal Frequency Division Multiple Access (OFDMA) systems, it is desirable for each mobile station to transmit radio signals with a power level that is high enough to ensure proper signal reception at an intended receiver, and yet low enough to preserve energy and to prevent from causing interference to other unintended receivers. In addition, system capacity can be maximized by controlling the transmitting power of the mobile station to achieve minimum required channel quality. In a Close Loop Power Control (CLPC) mechanism, the transmitting power level of a mobile station is controlled by a Transmit Power Control (TPC) command transmitted from its serving base station.

Figure 1:
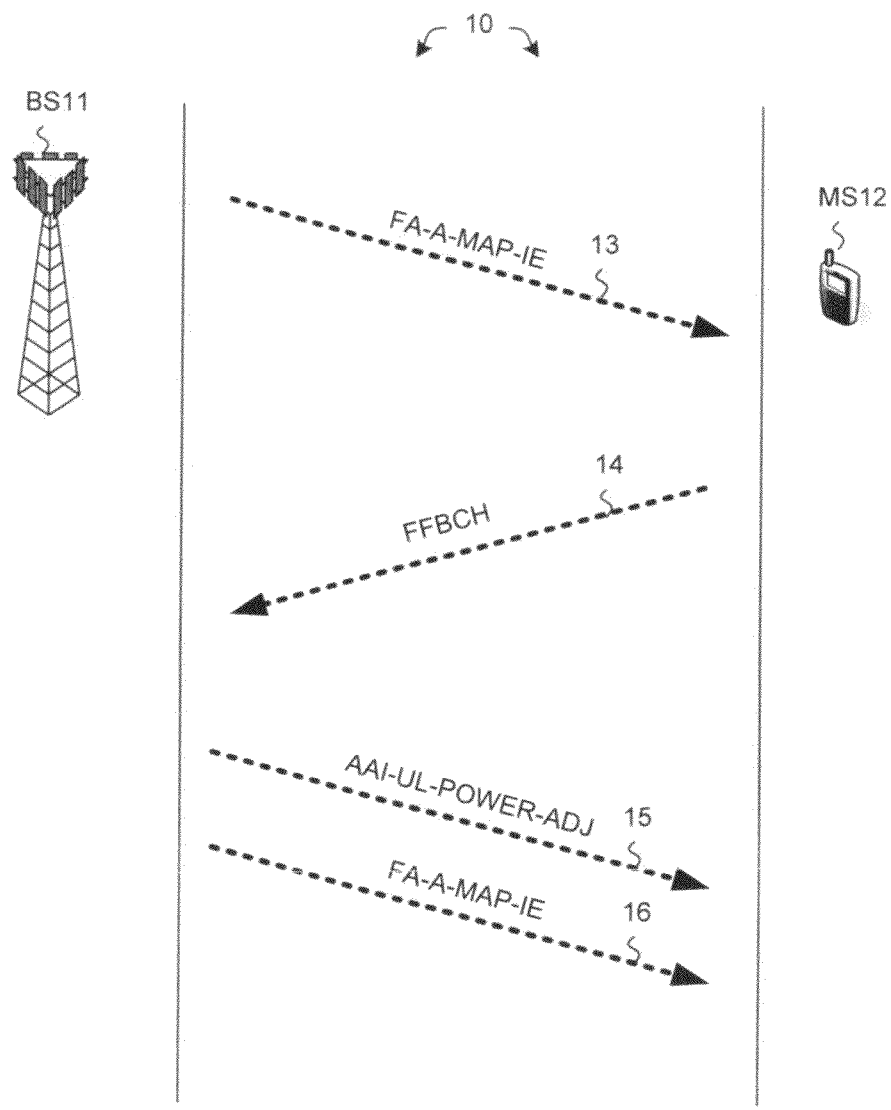
FIG. 1 (Prior Art) is a signal diagram that illustrates operation of a conventional uplink power control scheme in a wireless OFDMA system.
Figure 2:
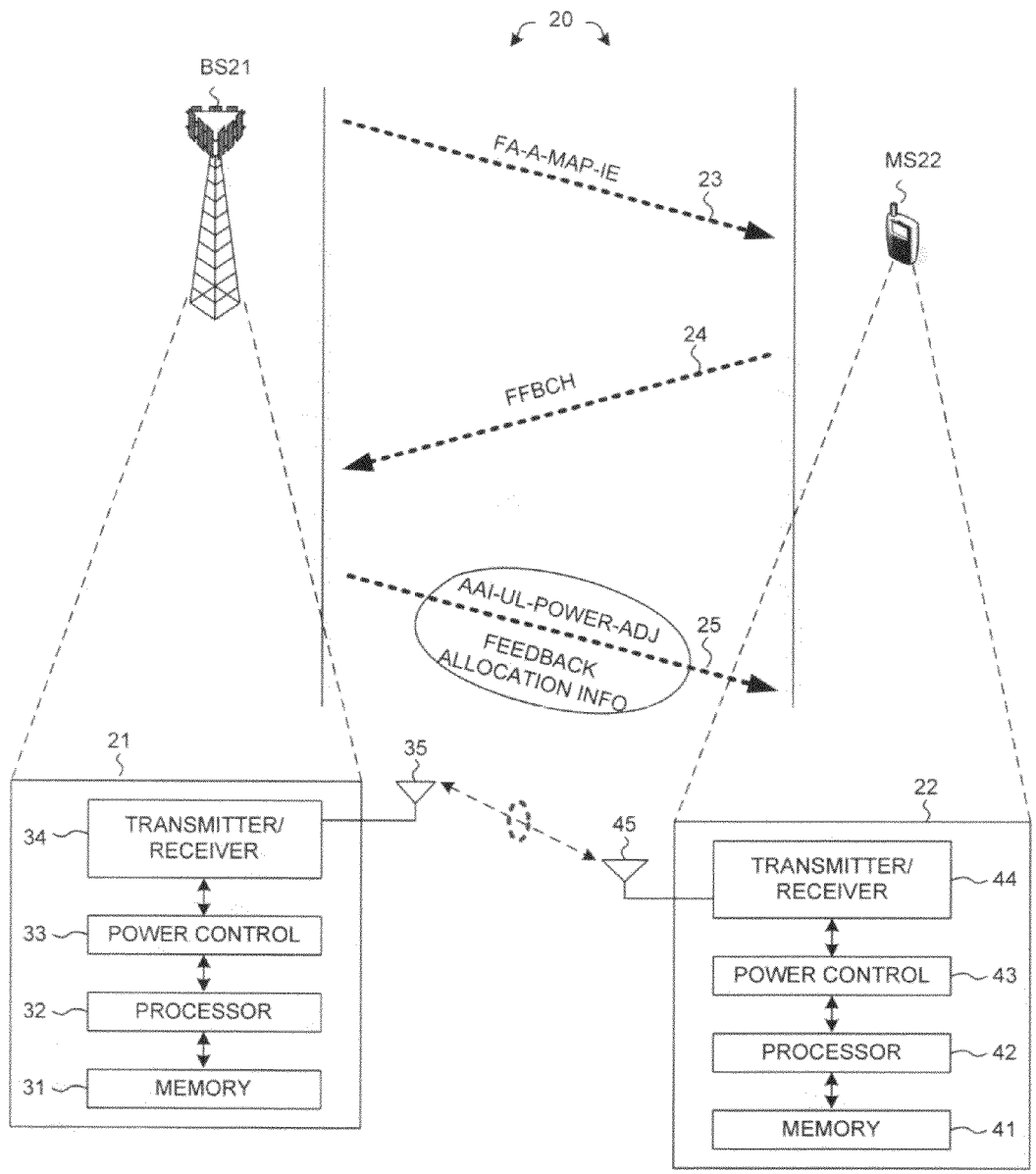
FIG. 2 is a signal and simplified block diagram that illustrates operation of an uplink power control in a wireless OFDMA system in accordance with one novel aspect.

FIG. 2 illustrates an uplink power control scheme in a wireless OFDMA system 20 in accordance with one novel aspect. Wireless OFDMA system 20 comprises a serving base station BS21 and a mobile station MS22. Serving base station BS21 comprises memory 31, a processor 32, a power control module 33, and a transmitter and receiver 34 coupled to an antenna 35. Similarly, mobile station MS22 comprises memory 41, a processor 42, a power control module 43, and a transmitter and receiver 44 coupled to an antenna 45. BS21 and MS22 communicate with each other by exchanging radio signals via an activated Radio Frequency (RF) carrier. For uplink power control, BS21 monitors the channel quality of an uplink channel of MS22, and then generates a power adjustment message by power control module 33. The power adjustment message is then transmitted by transmitter/receiver 34 to deliver a power offset that tracks any channel variation of the monitored uplink channel. In Time Division Duplex (TDD) systems, uplink channel quality can be derived from downlink channel measurement due to channel reciprocity. In Frequency Division Duplex (FDD) systems, uplink channel quality can also be estimated from downlink channel measurement by exploiting channel correlation between downlink and uplink channels.

As illustrated in the signal diagram of FIG. 2, serving base station BS21 first configures a fast feedback channel (FFBCH) 24 via a feedback allocation Advanced-MAP information element (FA-A-MAP-IE) 23. FFBCH is allocated periodically for a certain amount of time. For example, the periodicity and duration of FFBCH 24 are both decided by feedback allocation information contained in FA-A-MAP-IE 23. Mobile station MS22 then measures and reports downlink channel information via the configured FFBCH 24. Based on the received downlink channel information, BS21 estimates uplink channel quality and thereby detects a channel variation. BS21 then transmits a uplink power adjustment message (AAI-UL-POWER-ADJ) 25 to track the channel variation by delivering a power offset. In addition, BS21 also transmits additional feedback allocation information to MS22. In one novel aspect, the feedback allocation information is embedded within AAI-UL-POWER-ADJ message 25 and transmitted together as a single message to save signaling overhead.

Because radio resources in wireless OFDMA systems are partitioned into subcarriers within each RF carrier, radio signals are thus transmitted by each mobile station in a data stream using a specific subcarrier (e.g., a sub-channel). The transmitting power of a particular channel is thus closely related to the channel quality. Currently, in advanced wireless OFDMA system (e.g., wireless OFDMA system 20 of FIG. 2), the power control formula of a mobile station (e.g., MS22) can be described as follows:

$$P = L + SINR_{TARGET} + NI + \text{Offset} \quad (1)$$

where P is the transmitting power level per data stream and per subcarrier for the current transmission, L is the estimated average downlink propagation loss calculated by the mobile station (e.g., MS22), $SINR_{TARGET}$ is the target uplink signal to interference and noise ration received by the base station (e.g. BS21), NI is the estimated average power level of the noise and interference per subcarrier at the base station, and Offset is a correction term for power offset for the mobile station. The power offset is controlled by a power control command transmitted from the base station to the mobile station.

FIG. 3 is a diagram that illustrates a structure of a frame in accordance with a communication protocol employing a novel AAI-UL-POWER-ADJ message design. The frame structure of FIG. 3 is not an actual frame structure, but rather is a simplified illustration presented here for instructional purposes. The frame in FIG. 3 includes downlink subframes 51, 53, and an uplink subframe 52. A downlink subframe is communicated from the base station to one or more mobile stations, and an uplink subframe is communicated from a mobile station back to the base station. As is known in the art, the units of the vertical axis represent various subcarriers (i.e., sub-channels) that may be used for communication. The horizontal axis represents time extending from left to right in time domain. The downlink subframe is therefore followed in time by the uplink subframe.

As illustrated in FIG. 3, inside the downlink subframe 51, a FA-A-MAP-IE 54 is included to configure a FFBCH 55 of the following uplink subframe 52. FFBCH is allocated by a base station to monitor an uplink channel of a mobile station periodically. For example, the starting frame and subframe, as well as the duration and periodicity of FFBCH 55 are configured via FA-A-MAP-IE 54. Via the configured FFBCH 55, the mobile station reports its downlink channel information back to the base station. The base station estimates the uplink channel quality such as the signal to interference plus noise power ratio (SINR) based on FFBCH 55. Based on the estimated uplink channel quality, the base station derives power level of the uplink channel. The base station is then able to determine whether there is any channel variation and whether a power adjustment is needed in response to the channel variation. If a power adjustment is needed, then a power offset is delivered to the mobile station via an AAI-UL-POWER-ADJ message 56.

AAI-UL-POWER-ADJ 56 is transmitted as a MAC control message in downlink subframe 53 signaled to a specific mobile station. AAI-UL-POWER-ADJ 56 is able to provide a large power jump to adapt to the detected channel variation quickly. In accordance with one novel aspect, AAI-UL-POWER-ADJ 56 is not a conventional uplink power adjustment message, but instead also comprises additional feedback allocation information that re-configures FFBCH 55. Instead of transmitting another independent FA-A-MAP-IE for FFBCH re-configuration, necessary feedback allocation information is embedded within the novel AAI-UL-POWER ADJ 56 and transmitted as a single message. For example, the feedback information may include a decreased periodicity of FFBCH 55 such that closer monitoring of the uplink channel can be performed by the base station in the event of large channel variation.

FIG. 4 is a flow chat that illustrates a method of uplink power control in accordance with one novel aspect. In step 61, a serving base station allocates an uplink FFBCH via an FA-A-MAP-IE. The FA-A-MAP-IE comprises feedback allocation information that decides the starting frame and subframe, as well as the duration and periodicity of the FFBCH that a mobile station can use for reporting uplink channel information. In step 62, the base station receives downlink channel information such as the SINR of the downlink channel via the allocated FFBCH. Based on the received channel information, the base station estimates uplink channel quality and thereby detects any channel variation. In step 63, based on the detected channel variation, the base station generates a novel AAI-UL-POWER-ADJ message that delivers a power offset to adjust the transmitting power level of the mobile station. In one novel aspect, the novel AAI-UL-POWER-ADJ message also comprises feedback allocation information that re-allocates the FFBCH. Finally, in step 64, the base station transmits the novel AAI-UL-POWER-ADJ message to the mobile station. The mobile station receives the power offset inside the AAI-UL-POWER-ADJ message to adjust its transmitting power level accordingly. In addition, the mobile station receives the feedback allocation information inside the AAI-UL-POWER-ADJ message for re-allocated FFBCH.

FIG. 5 illustrates a novel AAI-UL-POWER-ADJ message that comprises additional feedback allocation information. In wireless OFDMA systems, messages transmitted in data channels are communicated via various sizes of resource blocks. Each resource block contains a certain amount of data bits to be transmitted and received between a base station and a mobile station. In IEEE 802.16m systems, the minimum resource unit contains seventy-two data bits for data channel transmission (e.g., as indicated by downlink basic A-A-MAP-IE). When the base station transmits the AAI-UL-POWER-ADJ message as described above in step 63 of FIG. 4, it would be most efficient to transmit both the AAI-UL-POWER-ADJ message and the feedback allocation information using a minimum resource unit. A minimum resource unit, however, is not big enough to hold a conventional AAI-UL-POWER-ADJ message as well as a conventional FA-A-MAP-IE.

As illustrated in FIG. 5, resource unit 70 is a minimum resource unit defined in IEEE 802.16m that is able to hold seventy-two data bits. In a conventional AAI-UL-POWER-ADJ message 71, the content of message 71 includes an eight-bit long octet string of message type, a six-bit long integer of data offset used to adjust an uplink data channel power level, and a six-bit long integer of control offset used to adjust a downlink control channel power level. Thus, the total number of information bits inside AAI-UL-POWER-ADJ 71 is twenty bits with addition sixteen-bit Cyclic Redundancy Check (CRC) appended for integrity check. As a result, the overall payload size of the conventional AAI-UL-POWER-ADJ message 71 is thirty-six bits in total. On the other hand, in a conventional FA-A-MAP-IE 72, the number of information bits without CRC can be as big as forty bits. Thus, the number of data bits after combining AAI-UL-POWER-ADJ message 71 and FA-A-MAP-IE 72 is more than the size of resource unit 70.

However, some of the information elements inside conventional FA-A-MAP-IE 72 are redundant with some of the content inside conventional AAI-UL-POWER-ADJ message 71. For example, conventional FA-A-MAP-IE 72 includes a four-bit long MAP information element (A-MAP-IE) Type, a one-bit long ACK Allocation Flag, and a six-bit long Hybrid Automatic Repeat Request (HARQ) Feedback Allocation (HFA), those elements provide a total of eleven bits of redundant information if used together with conventional AAI-UL-POWER-ADJ message 71. Therefore, after excluding the A-MAP-IE Type, the ACK Allocation Flag and the HFA, the size of the remaining elements in FA-A-MAP-IE 72 is bounded by twenty-nine bits. In addition, a one-bit long control flag is added to indicate whether FA-A-MAP-IE information is present. As a result, it is possible to combine the conventional AAI-UL-POWER-ADJ message 71 with the remaining elements in FA-A-MAP-IE 72 to be fitted into resource unit 70. In accordance with one novel aspect, the conventional AAI-UL-POWER-ADJ message 71 is modified to become a novel AAI-UL-POWER-ADJ message 73. The novel AAI-UL-POWER-ADJ message 73 contains both uplink power adjustment information as well as feedback allocation information. Most importantly, the novel AAI-UL-POWER-ADJ message 73 is under seventy-two bits and can be transmitted using minimum resource unit 70.

FIG. 6 illustrates a first embodiment of a novel AAI-UL-POWER-ADJ message 80. As illustrated in FIG. 5, AAI-UL-POWER-ADJ message 80 contains two basic parameters for power adjustment: a six-bit long integer of data offset used to adjust an uplink data channel power level, and a six-bit long integer of control offset used to adjust an uplink control channel power level. AAI-UL-POWER-ADJ message 80 also includes a one-bit control flag that indicates whether feedback allocation related information exists in this particular message. For example, if the control flag is set to zero, then it indicates that this particular AAI-UL-POWER-ADJ message does not contain any feedback allocation information. On the other hand, if the control flag is set to one, then it indicates that this particular AAI-UL-POWER-ADJ message contains feedback allocation related information.

In the example of FIG. 6, AAI-UL-POWER-ADJ message 80 includes feedback allocation related information. Feedback allocation related information includes the following: a channel index that identifies the configured feedback channel, a short-term feedback period and a long-term feedback period that decides the periodicity of the configured feedback channel, a frame offset number and a subframe index that determines the starting time of the configured feedback channel, and an allocation duration that defines the duration of the configured feedback channel. In this power adjustment message design, a base station transmits AAI-UL-POWER-ADJ message 90 using a minimum resource unit, and a mobile station can use the same AAI-UL-POWER-ADJ message 90 to adjust transmitting power level and to allocate FFBCH.

FIG. 7 illustrates a second embodiment of a novel AAI-UL-POWER-ADJ message 90. Similar to AAI-UL-POWER-ADJ message 80, AAI-UL-POWER-ADJ message 90 contains two basic parameters for power adjustment, as well as a control flag that indicates whether feedback allocation related information exists in this particular message. In the example of FIG. 7, however, AAI-UL-POWER-ADJ message 90 includes feedback allocation related information as well as Multiple-Input and Multiple-Output (MIMO) feedback related information. MIMO feedback related information includes the following parameters: mFM, maxMt, feedback format, FPI, long and short FPI Switch Flag, long-term FPI, codebook mode, codebook subset, codebook coordination, and measurement method indication. In this power adjustment message design, a base station transmits AAI-UL-POWER-ADJ message 90 using a minimum resource unit, and a mobile station can use the same AAI-UL-POWER-ADJ message 90 to adjust transmitting power level, to allocate FFBCH, and to configure MIMO feedback operation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    configuring a fast feedback channel by transmitting a feedback allocation message from a base station to a mobile station in a wireless OFDMA system;
    monitoring uplink channel quality based on downlink channel information transmitted via the fast feedback channel from the mobile station and thereby detecting a channel variation; and
    generating and transmitting a power adjustment message to deliver power adjustment information in response to the detected channel variation, wherein the power adjust message also comprises feedback allocation information to re-configure the fast feedback channel, and wherein the power adjustment message further comprises an indication on whether the feedback allocation information is piggybacked within the power adjustment message.

2. The method of claim 1, wherein the base station transmits the power adjustment message via a data channel using a minimum data resource unit, and wherein the minimum data resource unit size is predefined in the wireless OFDMA system.

3. The method of claim 2, wherein the generating of the power adjust message involves removing redundant information contained in the feedback allocation message such that the overall power adjustment message size is smaller or equal to the minimum data resource unit size.

4. The method of claim 3, wherein the redundant information comprises at least information element type.

5. The method of claim 1, wherein the power adjustment message is used to adjust an uplink transmitting power for the mobile station.

6. The method of claim 1, wherein the feedback allocation information is used to configure periodicity and duration of the fast feedback channel for the mobile station.

7. The method of claim 1, wherein the power adjustment massage also comprises multiple-input multiple-output (MIMO) feedback information that is used in MIMO mode operation for the mobile station.

8. A base station, comprising:
    a power control module that configures a fast feedback channel by transmitting a feedback allocation message to a mobile station in a wireless OFDMA system;
    a receiver that receives downlink channel information transmitted via the fast feedback channel from the mobile station and thereby estimates uplink channel quality and detects a channel variation; and
    a transmitter that transmits a power adjustment message to deliver power adjustment information in response to the detected channel variation, wherein the power adjust message also comprises feedback allocation information to re-configure the fast feedback channel, and wherein the power adjustment message further comprises an indication on whether the feedback allocation information is piggybacked within the power adjustment message.

9. The base station of claim 8, wherein the base station transmits the power adjustment message via a data channel using a minimum data resource unit, and wherein the minimum data resource unit size is predefined in the wireless OFDMA system.

10. The base station of claim 9, wherein the base station generates the power adjustment message by removing redundant information contained in the feedback allocation message such that the overall power adjustment message size is smaller or equal to the minimum data resource unit size.

11. The base station of claim 10, and wherein the redundant information comprises at least information element type.

12. The base station of claim 8, wherein the power adjustment information is used to adjust an uplink transmitting power for the mobile station.

13. The base station of claim 8, wherein the feedback allocation information is used to configure periodicity and duration of the fast feedback channel for the mobile station.

14. The base station of claim 8, wherein the power adjustment massage also comprises multiple-input multiple-output (MIMO) feedback information that is used in MIMO mode operation for the mobile station.

15. A method, comprising:
    transmitting downlink channel information via a fast feedback channel from a mobile station to a base station in a wireless OFDMA system, wherein the downlink channel information indicates an uplink channel variation; and
    receiving a power adjustment message in response to the channel variation, wherein the power adjust message comprises power adjustment information as well as feedback allocation information to configure the fast feedback channel, and wherein the power adjustment message further comprises an indication on whether the feedback allocation information is piggybacked within the power adjustment message.

16. The method of claim 15, wherein the power adjustment message is transmitted via a data channel using a minimum data resource unit, and wherein the minimum data resource unit size is predefined in the wireless OFDMA system.

17. The method of claim 16, wherein the power adjustment message is generated by removing redundant information contained in the feedback allocation message such that the overall power adjustment message size is smaller or equal to the minimum data resource unit size.

18. The method of claim 17, wherein the redundant information comprises at least information element type information.

19. The method of claim 15, wherein the mobile station uses the power adjustment information to adjust an uplink transmitting power.

20. The method of claim 15, wherein the mobile station uses the feedback allocation information to configure periodicity and duration of the fast feedback channel.

21. The method of claim 15, wherein the power adjustment massage also comprises multiple-input multiple-output (MIMO) feedback information that is used in MIMO mode operation for the mobile station

* * * * *